United States Patent [19]

Gross et al.

[11] 4,050,799

[45] Sept. 27, 1977

[54] MICROFORM READER

[75] Inventors: Roger A. Gross, Hartford; Marvin D. Radloff, Woodland; Donald D. Gault, Neosho, all of Wis.

[73] Assignee: Bell & Howell Company, Chicago, Ill.

[21] Appl. No.: 563,949

[22] Filed: Mar. 31, 1975

[51] Int. Cl.² .................... G03B 21/22; G02B 7/02; G03B 3/00

[52] U.S. Cl. ........................ 353/74; 350/252; 353/76; 353/96; 353/99; 353/101

[58] Field of Search ............ 353/27, 70, 69, 74, 353/76, 96, 98, 99, 101; 350/252

[56] References Cited

U.S. PATENT DOCUMENTS

| | | | |
|---|---|---|---|
| 2,137,286 | 11/1938 | Herbig | 350/252 |
| 3,296,924 | 1/1967 | Levin et al. | 353/69 |
| 3,588,230 | 6/1971 | Rieux | 350/252 |
| 3,634,005 | 1/1972 | Peters et al. | 353/101 |
| 3,860,333 | 1/1975 | Graef | 353/27 R |
| 3,879,112 | 4/1975 | Hickey | 350/310 |

FOREIGN PATENT DOCUMENTS 840,928 6/1952 Germany .................. 353/98

Primary Examiner—Steven L. Stephan
Attorney, Agent, or Firm—Robert A. Walsh

[57] ABSTRACT

The disclosure relates to a microform reader apparatus of the type which projects a magnified image of an image film frame onto the rear side of a viewing screen to facilitate forward viewing of the magnified image. The microform reader of the present invention includes an adjustable mirror assembly positioned between a light source and condensing lens for optimizing the brightness of the displayed image. In a preferred form the mirror assembly is adjustable from the front of the microform reader to allow simultaneous monitoring of the brightness of the display while the adjustment is being made. The microform reader of the present invention also includes an adjustable lens assembly which allows the optical axis of the lens assembly to be adjusted for perpendicularity to the image frame surface.

9 Claims, 7 Drawing Figures

MICROFORM READER

BACKGROUND OF THE INVENTION

The present invention is directed to a reader apparatus of the type which projects a magnified image of a film frame onto the rear side of a viewing screen to facilitate forward viewing of the magnified image. The invention is more particularly directed to an improved microform reader which includes an adjustable mirror assembly for optimizing the brightness of the displayed image on the viewing screen and an adjustable lens assembly which allows the optical axis of the projection lens assembly to be adjusted for perpendicularity to the image frame surface.

Microform readers are well known in the art and provide greatly magnified images of single film frames of a roll of microfilm, microfiche, or ultrafiche for viewing purposes. Although the present invention is equally applicable to any microform reader, the preferred embodiment herein will be directed to an ultrafiche readers. Such devices generally include a light source, a condensing lens, and a projection system for magnifying and projecting a magnified image of a film frame image onto a viewing screen. Inasmuch as the film frame images are extremely small relative to the displayed image, and therefore greatly magnified, the position of the various elements of such a reader is critical.

In particular, the light directed through the condensing lens must be of an intensity which allows the displayed image to be of adequate brightness for viewing purposes. Such readers generally include a mirror positioned between the light source and condensing lens for directing the light emitted from the light source through the condensing lens and thus through the film frame image to be displayed. The relative position of the mirror is critical to provide adequate viewing brightness. Additionally, the projection lens assembly which magnifies the image frame must be postioned such that its optical axis is perpendicular to the film frame surface to assure proper focusing for the entire film frame. Inasmuch as the film frame is being magnified a great number of times, slight variations in the normality of the axis of the projection lens assembly to the surface of the image frame can cause portions of the displayed images to be out of focus. Therefore, it is essential that the optical axis of the projection lens be perpendicular to the film frame surface.

The critical positioning of the above mentioned elements of such readers is generally obtainable with readers constructed of metallic materials but the problems associated with their relative positions are greatly magnified when the readers have housing component parts constructed out of plastic. This obtained because the non-uniformities in the plastic forming process and extraction of the elements from their molds cause the plastic parts to be generally non-uniform. To overcome there difficulties, it is therefore disirable to provide an adjustable mirror assembly for optimizing the brightness of the displayed image and an adjustable projection lens assembly which allows the optical axis of the projection lens assembly to be adjusted for perpendicularity to the film frame surface.

It is therefore a general object of the present invention to provide an improved microform readers apparatus.

It is another object of the present invention to provide an improved microform reader apparatus which includes an adjustable mirror assembly to optimize the brightness of the displayed images.

It is still a more particular object of the present invention to provide a microform reader having an adjustable mirror assembly which is adjustable from the front of the ultrafiche reader to allow simultaneous monitoring of the brightness of the displayed image as the position of the mirror is adjusted.

It is a further particular object of the present invention to provide a microform reader which has an adjustable projection lens assembly which allows the optical axis of the projection lens assembly to be adjusted for perpendicularly to the image frame surface.

SUMMARY OF THE INVENTION

The invention provides a microform reader apparatus of the type which projects a magnified image of a film frame onto a viewing screen and which includes a light source, a condensing lens, a film holder and a projection lens assembly including a projecting lens and a plurality of mirrors for projecting the magnified image onto the viewing screen with the improvement of an adjustable mirror assembly for maximizing the light delivered to the projecting lens to optimize the brightness of the displayed image. The microform reader adjustable mirror assembly includes a mirror having a major reflecting surface positioned in between the light source and the condensing lens for receiving the light emitted by the light source on said major reflecting surface, a universal mount for holding the mirror and for providing the mirror freedom of arcuate positional movement about first and second axes. the first and second axes being perpendicular to each other, first urging means abutting the universal mount for adjusting the position of the mirror about the first axis, second urging means abutting the universal mount for adjusting the position of the mirror about the second axis, and means for holding the first and second urging means in constant abutment relation to the universal mount to thereby hold the mirror in a fixed position about the first and second axes.

The present invention also provides a microform reader apparatus of the type which projects a magnified image of a film frame image onto a viewing screen and which includes a light source, a condensing lens, a film frame holder, and a projection system including a plurality of mirrors for projecting the magnified image onto the viewing screen which has the improvement of an adjustable lens assembly which allows the optical axis of the lens assembly to be adjusted for perpendicularity to the image frame surface. The microform reader apparatus adjustable lens assembly includes a generally cylindrical lens holder assembly having a major center axis for holding at least one projection lens having a center optical axis in a predisposed relation such that the major axis and the optical axis substantially coincide, a generally cylindrical first adjustment ring dimensioned for receiving the lens holder and having a continuous circumferential flange having an upper surface and a ramped under surface, and a second adjustment ring dimensioned for receiving the first adjustment ring and having an inner circumferential ramped surface portion communicating with the ramped under surface, whereby, as the first and second rings are rotated relative to each other, the pitch of the first ring and the lens holder assembly is varied relative to the second ring by the coacting of the ramped surfaces to render the angle of incidence of the lens assembly optical axis relative to the image surface adjustable.

BRIEF DESCRIPTION OF THE DRAWINGS

The invention, together with the objects and advantages thereof, may best be understood by reference to the following description taken in conjunction with the accompanying drawings, and in the several FIGURES of which like reference numerals identify like elements, and in which.

DESCRIPTION OF THE PREFERRED EMBODIMENT

Figure 1:
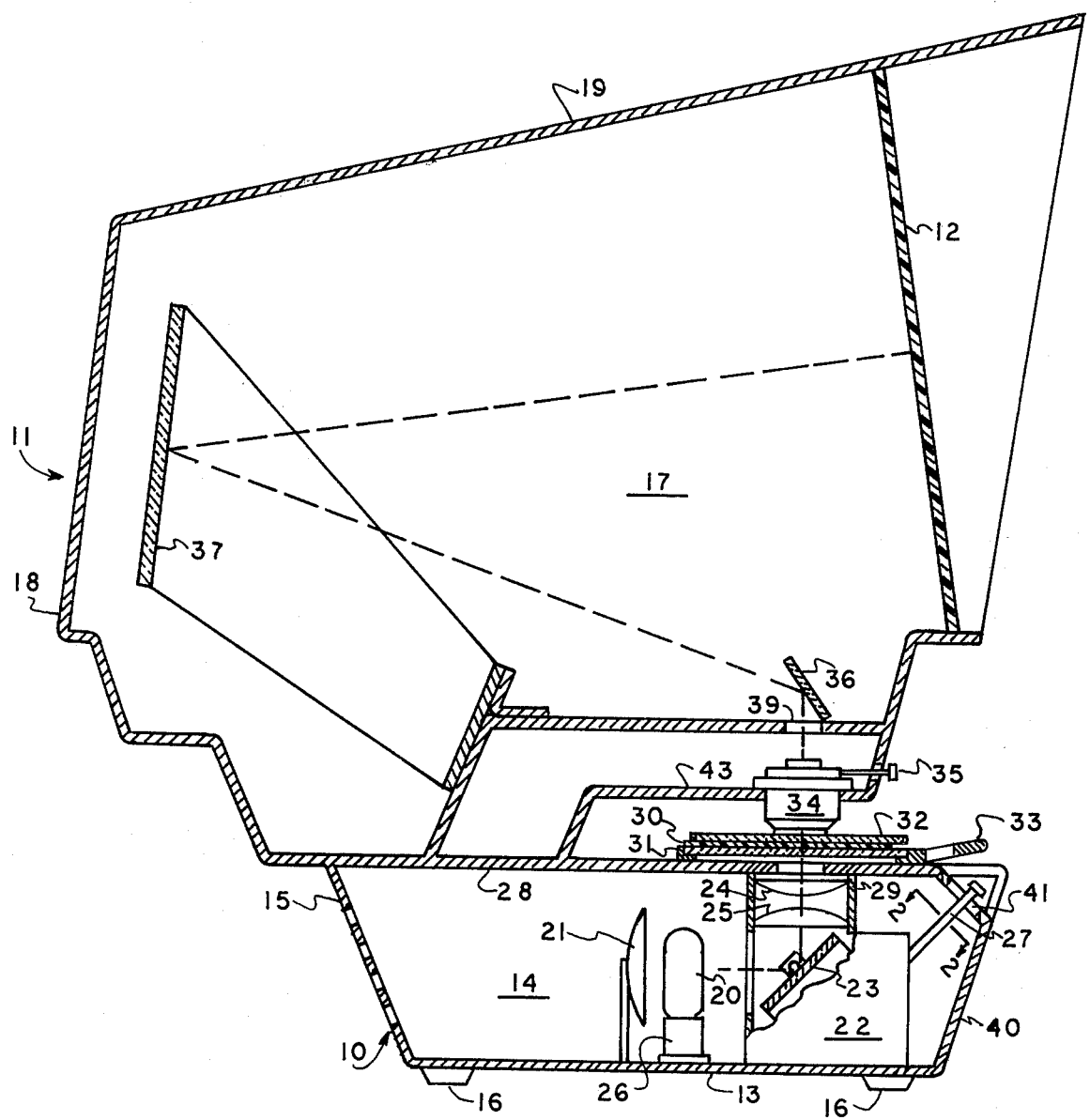
FIG. 1 is a cross-sectional side view of an altrafiche reader of the type which may utilize the present invention.

Referring now to FIG. 1, the microform reader thereshown comprises a base housing 10 which contains an illumination system, and an upper housing 11 which includes a back projection type veiwing screen 12. Base housing 10 has a bottom panel 13, side walls 14, a rear wall 15 and a front wall 40. The base housing 10 also includes feet 16 which are secured to the bottom panel 13 and upon which the base housing rests.

The upper housing includes a back wall 18, and a side wall 17 and a top panel 19 which extend forward of screen 12 to reduce the amount of ambient light striking the screen 12. The viewing screen 12 is mounted within upper housing 11 in a rearwardly inclined position relative to the vertical to afford comfortable viewing.

The illumination system of base housing 10 comprises a light source or projection lamp 20, a reflector 21, an adjustable mirror assembly embodying the present invention designated generally at 22 which includes mirror 23, and condensing lenses 24 and 25. Projection lamp 20 is mounted in a suitable socket 26 which connects the illuminating elements of projection lamp 20 to a suitable power source not shown. The reflector 21 concentrates and directs the light emitted from light source 20 toward mirror 23 of the adjustable mirror assembly 22 which in turn reflects the light to and through the condensing lenses 24 and 25. The adjustable mirror assembly 22 comprises two adjustment shafts, one of which is shown at 27 which extends in a forward direction through an opening 41 of front wall 40. The mirror adjustment assembly allows the position of mirror 23 to be adjusted about two perpendicular axes for optimizing the amount of light transferred from the light source to the condensing lenses to thus maximize the brightness of the image displayed on viewing screen 12. Because the adjustment shafts extend forward and out front wall 40, simultaneous monitoring of the displayed image brightness and adjustment of the mirror assembly is provided, Separating the base housing 10 and upper housing 11 is plate 28 which includes an aperture 29 which allows the light emitted from light source 20 and reflected by mirror 23 to pass from the condensing lenses 24 and 25 to a selected image film frame on ultrafiche 30.

On top of plate 28 is an ultrafiche holder which comprises a bottom glass plate 31 and a top glass plate 32 for holding the ultrafiche in a single plane. The pair of glass plates 31 and 32 comprise an ultrafiche holder which has an arm 33 which may be manipulated for selecting the desired film frame to be viewed.

The upper housing in addition to including viewing screen 12, also includes a projection assembly which projects the magnified image of the selected image frame onto viewing screen 12. The projection assembly includes a projection lens assembly generally designated at 34 which embodies the present invention and which will be described in detail hereinafter. It is held by lens assembly plate 43 and includes a focusing adjustment knob 35 which when rotated causes the projection lens within the projection lens assembly 34 to move vertically to provide focusing of the displayed image. The projection assembly also includes a plurality of mirrors 36 and 37. Mirror 36 is shown schematically in that mirrors of this type are well known in the art. Mirror 36 reflects the image to be displayed in a rearward direction toward mirror 37 which reflects the image forward to the rear side of screen 12 to be displayed. The details of the mountings of these mirrors will not be described inasmuch as they are well known in the art.

Upper housing 11 also includes an aperture 39 which allows the image to be displayed to pass from the projection lens assembly 34 to mirror 36.

Figure 3:
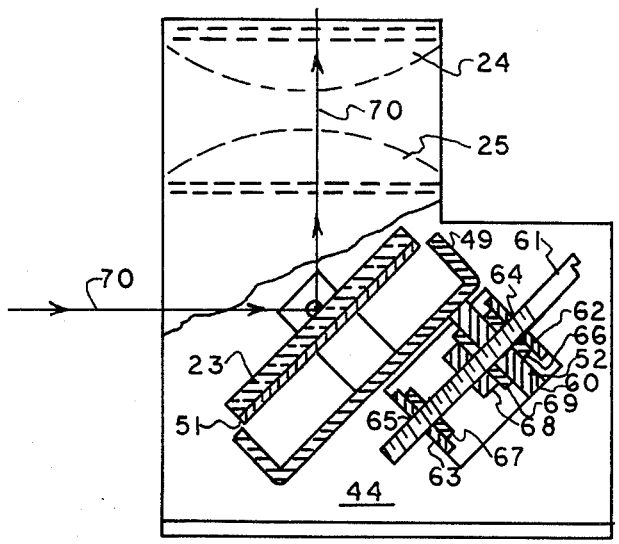
FIG. 3 is a cross-sectional view taken along lines 3—3 of FIG. 2.
Figure 2:
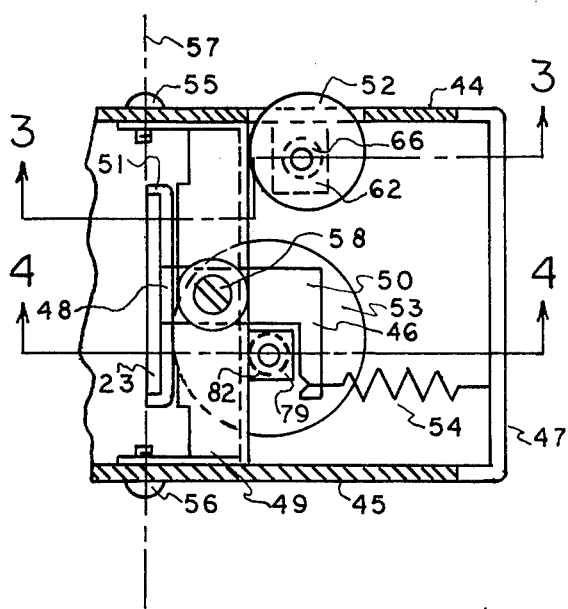
FIG. 2 is a partial cross-sectional view taken along lines 2—2 of FIG. 1.
Figure 4:
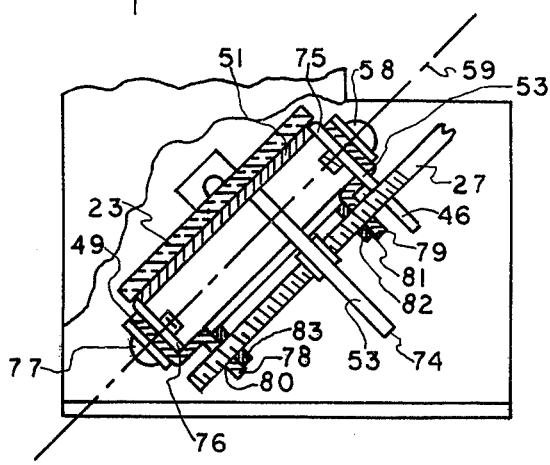
FIG. 4 is a cross-sectional view taken along lines 4—4 FIG. 2.

FIGS. 2, 3 and 4 are detailed views of an adjustable mirror assembly 22 of the type which embodies the present invention. Referring now to FIG. 2, the adjustable mirror assembly comprises the housing including said walls 44, 45 and end wall 47, a universal mount comprising a first member 49 and a second member 50, first and second eccentric cams 52 and 53 respectively, and a resilient force means or spring 54.

First member 49 extends between side walls 44 and 45 and is pivotably connected to the side walls by screws 55 and 56 to thereby provide pivotal movement of the first member 49 about a first axis 57. The second member 50 has a first end 48 which includes a mirror holder 51 for holding mirror 23 and a second end 46 which is coupled to the adjacent end wall 47 by spring 54.

The second member is connected to the first member at a point intermediate its first and second ends 48 and 46 respectively by screw 58 to allow pivotable movement of second member 50 relative to first member 40 about screw 58. Because first member 49 pivots about first axis 57 and second member 50 pivots about a second axis 59 which includes the line running through screw 58 (FIG. 4), mirror 23 is afforded axes 57 and 59 which are perpendicular to each other.

Referring now more particularly to FIG. 3, the first eccentric cam 52 includes a cam surface 50 which abuts the first member 49 of the universal mount to serve as a first urging means to cause first member 49 to pivot about the first axis 57 as cam 52 is rotated. Cam 52 is rigidly coupled to shaft 61 so that the rotating of shaft 61 rotates eccentric cam 52. The eccentric cam 52 is held in position by means of flanges 62 and 63 formed out of side wall 44 and which have opening 64 and 65 respectively for receiving shaft 61. Shaft 61 is held in place to preclude axial movement by locking collars 66 and 67. Shaft 61 also includes locking collar 68 to further insure that eccentric cam 52 is rigidly coupled to shaft 61.

As eccentric cam 52 is rotated, the cam surface 60 which abuts first member 49 causes the first member 49 to pivot about the first axis 57 and therefore causes mirror 23 to pivot about first axis 57. The direction of the arrows 70 show the direction of the light emitted from the light source as it leaves the light source and is reflected toward the condensing lenses 24 and 25 of FIG. 1.

Referring now to FIG. 4, the second eccentric cam 53 has a cam surface 74 which extends through an opening of first member 49 to abut mirror holder 51 of the second member. The second member includes right angle flanges 75 and 76 adjacent to the first member 49 to facilitate the pivotal connection of the second member to the first member by screws 59 and 77. The first member 49 also includes flanges 78 and 79 which have openings 80 and 81 respectively for receiving shaft 27 which is rigidly connected to eccentric cam 53. Shaft 27 is held in place to avoid axial movement by locking collars 82 and 83. As can be seen in FIG. 4, eccentric cam 53 abuts the lens holder at a point such that as eccentric cam 53 is rotated the second member is pivoted about the second axis 59. Thus cam surface 74 serves as a second urging means which causes the mirror 23 to move in arcuate movement about the second axis 59.

The spring 54 which connects the second end 46 of second member 50 to end wall 47 assures that the universal mount is in constant abutment relation to the first and second cams 52 and 53 respectively.

In operation, when the position of mirror 23 is to be adjusted, the shafts 61 and 27 are rotated to cause the mirror 23 to move in arcuate movement about axes 57 and 59. Shafts 61 and 27 extend forward of the ultrafiche reader as can be more clearly seen in FIG. 1 to thereby provide for simultaneous monitoring of the brightness of the displayed image while the mirror position adjustment is being made.

Figure 5:
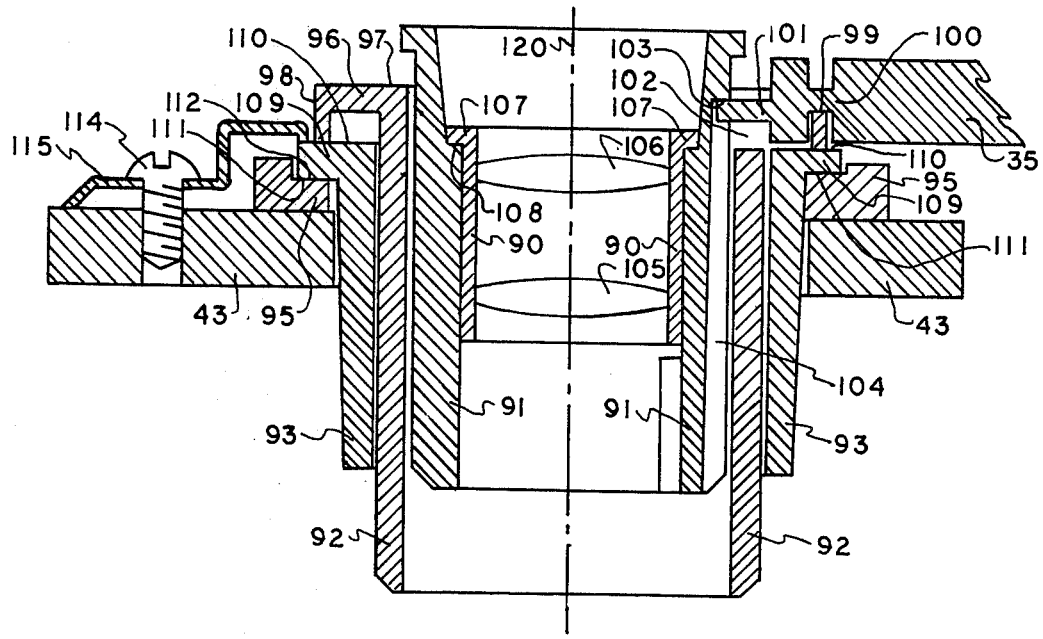
FIG. 5 is a cross-sectional side view of a projection lens assembly embodying the present invention.

Referring now to FIG. 5, there is shown a cross-sectional view of an adjustable lens assembly embodying another aspect of the present invention. It comprises a lens holder assembly including a lens holder cylinder 90, an outer lens cylinder 91, and a cylindrical sleeve 92, a first adjustment ring 93, and a second adjusting ring 95.

The cylindrical sleeve 92 is dimensioned for receiving the outer lens cylinder 91 in radially spaced relation so that the outer lens cylinder is free to move in an up and down direction for focusing purposes. The cylindrical sleeve 92 includes a flange 96 comprising the horizontal portion 97 and a vertical portion 98. The vertical portion 98 includes a semi-circular notch 99 for receiving a reduced diameter portion 100 of focusing shaft 35. Focusing shaft 35 also includes a pin 101 which extends through a semi-circular opening 102 of cylindrical sleeve 92 to engage surface 103 which is formed out of a recess 104 of outer lens cylinder 91. Pin 101 is spaced from the center axis of shaft 35 to thereby raise and lower outer lens cylinder 91 as shaft 35 turns.

In its preferred form, the adjustable lens assembly cylindrical sleeve 92 rests on top of glass plate 32 of the ultrafiche holder (see FIG. 1) and is free for vertical movement to assure that the projection lenses are a constant fixed distance from the image film frame being viewed. Inasmuch as these might be slight irregularities in the top surface of glass 32, the focusing shaft 35 is pivotable at its end opposite pin 101. By being so pivoted, pin 101 of shaft 35 will not constrain the vertical movement of outer lens cylinder 91 so that it will follow the vertical movement of cylindrical sleeve 92 as the ultrafiche holder is moved for selecting a desired film frame for viewing.

The lens holder cylinder 90 includes the projection lenses 105 and 106 and a flange portion 107 which rests upon an inner shelf 108 of the outer lens cylinder 91. The projection lenses have an optical axis 120 which coincides with the center axis of the lens holder cylinder 90, outer lens cylinder 91 and cylindrical sleeve 92.

Figure 6:
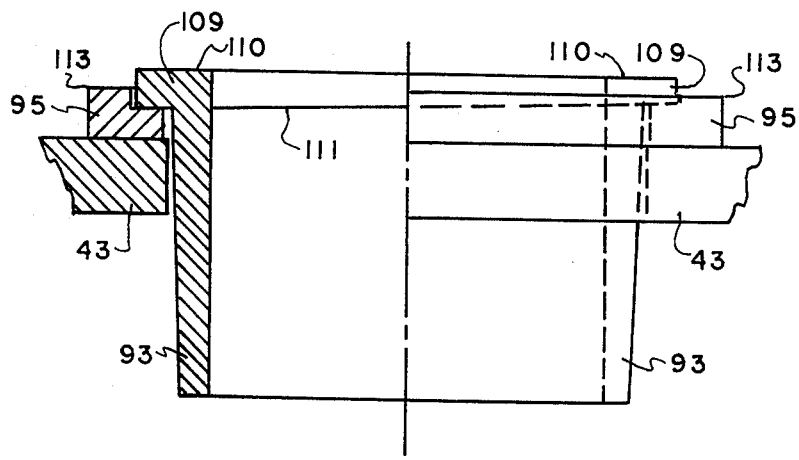
FIG. 6 is a cross-sectional side view showing in detail certain elements of the projection lens assembly of FIG. 5.

The lens holder assembly comprising lens holder cylinder 90, outer cylinder 91, and cylindrical sleeve 92 is received by a first adjustment ring 93. Adjustment ring 93 has a flange 109 having an upper surface 110 upon which flange 96 of sleeve 92 rests. Flange 109 additionally has an under surface 111 which is ramped as may be more clearly seen in FIG. 6.

The second adjustment ring 95 includes a recessed inner circumferential ramped surface 112 and is dimensioned for receiving the first adjustment ring so that the under surface 111 of flange 109 communicates with the inner recessed ramped surface 112 of second adjustment ring 95.

Second adjustment ring 95 rests upon lens holding plate 43 and the entire assembly is secured in place by means of a screw 114 and bracket 115. As shown, bracket 115 is shaped to come into contact with the upper surface 110 of flange 109 of the first adjustment ring 93. This assures that the lens assembly is held in place to avoid horizontal movement but additionally affords freedom of vertical movement for focusing of the projection lenses 105 and 106. Additionally, because surface 112 is recessed, the side wall 113 is defined by the recess and it assures that there will be little lateral or horizontal movement of the first ring relative to the second ring during the lens assembly adjustment.

In operation, when the optical axis of projection lenses 105 and 106 is to be adjusted for perpendicularity with the image frame surface, screw 114 is loosened and the first and second adjustment rings are rotated ralative to one another to vary the pitch of the optical axis of the projection lens. As the first and second adjustment rings are rotated relative to one another, the coaction of the two causes the pitch of the optical axis to vary by an amount which is related to the slope of the ramped surfaces of the first and second adjustment rings. After the optical axis has been adjusted for perpendicularity to the image frame surface, screw 114 is tightened to thereby maintain the lens assembly in the proper position as adjusted.

Figure 7:
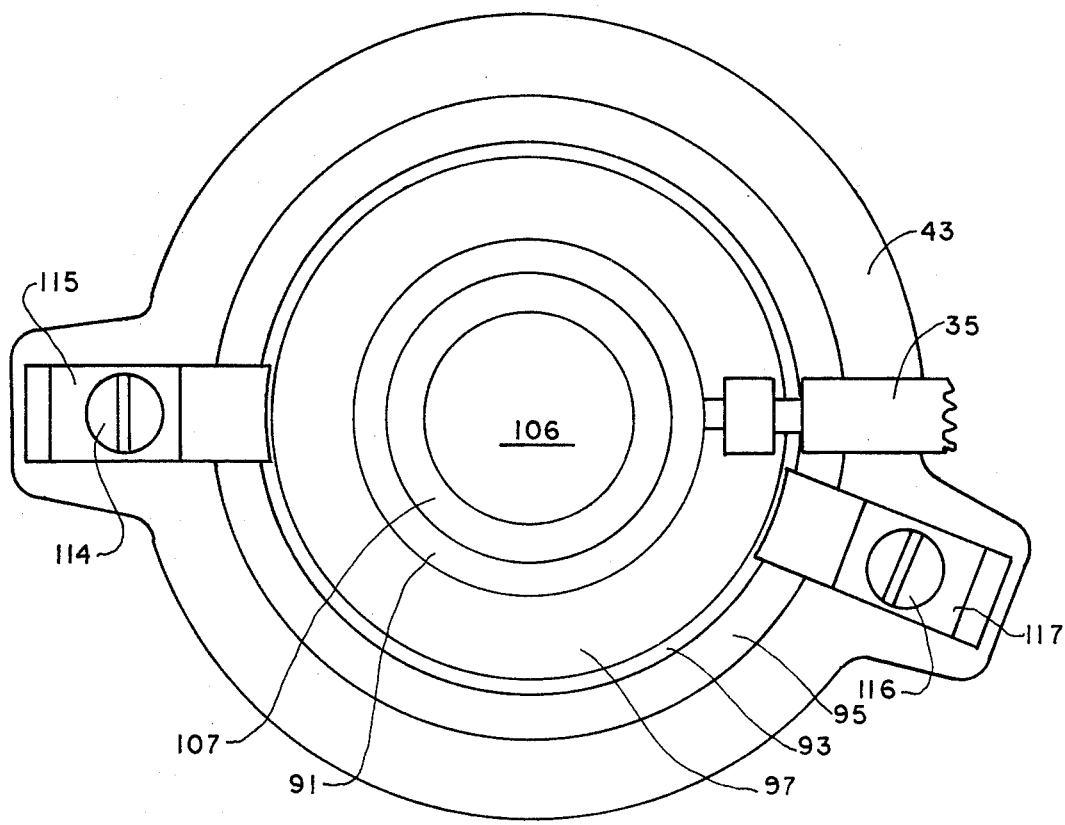
FIG. 7 is a top view of a projection lens assembly embodying the present invention.

FIG. 7 is a top view of a projection lens assembly embodying the present invention. Preferably, two locking screws 114 and 116 in conjunction with securing brackets 115 and 117 respectively are provided for holding the first and second adjustment rings 93 and 95 in their fixed relative position. Screw 16 and 17 are offset to allow adjustment of the optical axis relative to the image frame surface without necessitating the removal of the focusing shaft 35.

Although the various elements of the lens assembly have been referred to as being generally cylindrical in shape, it is understood that the invention could also be practiced having the various elements of the lens assembly slightly tapered conforming to sections of cones. Such cone sections for purposes of this preferred embodiment are considered to be generally cylindrical in shape also.

The present invention therefore provides a microform reader apparatus which includes an adjustable mirror assembly for optimizing the brightness of the displayed image and additionally an adjustable lens assembly which provides for the adjusting of the optical axis of the projection lenses to perpendicularity with the image frame surface of the ultrafiche. The mirror assembly may be adjusted from a forward position to thereby provide simultaneous monitoring of the brightness of the displayed image while the mirror adjustment is being made. Additionally, the projection lens assembly may be adjusted without the necessity of having to dismantle the assembly and therefore may be made readily at any time.

While particular embodiments of the invention have been shown and described, modifications may be made, and it is intended in the appended claims to cover all such modifications as may fall within the true spirit and scope of the invention.

What is claimed is:

1. In a microform reader apparatus of the type which projects a magnified image of a film frame onto a viewing screen and which includes a light source, a condensing lens, a film holder and a projection assembly including a projecting lens and a plurality of mirrors for projecting the magnified image onto the viewing screen, the improvement of an adjustable mirror assembly for maximizing the light delivered to the projection lens to optimize the brightness of the displayed image comprising:

a mirror having a major reflecting surface positioned in between the light source and the condensing lens for receiving the light emitted by the light source on said major reflecting surface;

a universal mount for holding said mirror and for providing said mirror freedom of arcuate positional movement about first and second axes, said first and second axes being perpendicular to each other;

first urging means abutting said universal mount for adjusting the position of said mirror about said first axis;

second urging means abutting said universal mount for adjusting the position of said mirror about said second axis;

said first and second urging means each comprising an eccentric cam having a cam surface abutting said universal mount, the rotation of said cams causing said mirror to move about said first and second axes;

a pair of side walls, said universal mount including a first member extending across said side walls and pivotably mounted to said side walls;

a second member having first and second ends, said first end including a mirror holder for holding said mirror, said second member being pivotably mounted to said first member at an intermediate point between said first and second ends;

an end wall adjacent said second end of said second member; and;

resilient force means connecting said second end to said end wall to thereby maintain said cam surfaces in constant abutment relation to said universal mount.

2. An apparatus in accordance with claim 1 wherein said first cam abuts said first member and wherein said second cam abuts said lens holder at said first end of said second member.

3. An apparatus in accordance with claim 1 wherein said resilient force means is a spring.

4. In a microform reading apparatus of the type which projects a magnified image of a film frame onto a viewing screen and which includes a light source, a condensing lens, a film holder, and a projection assembly including a projecting lens and a plurality of mirrors for projecting the magnified image onto the back side of a viewing screen to provide front viewing of the displayed image, the improvement of an adjustable mirror assembly for maximizing the light delivered to the projection lens to optimize the brightness of the displayed image comprising:

a mirror positioned in between the light source and the condensing lens and having a major reflecting surface for reflecting the light provided by the light source to the condensing lens;

a universal mount comprising first and second members, said second member having a mirror holder at one end for holding said mirror, said first member being pivotable about a first axis, said second member being pivotably mounted to said first member to thereby pivot about a second axis which is perpendicular to said first axis whereby said mirror has freedom of arcuate movement about said first and second perpendicular axes;

a first eccentric cam having a cam surface abutting said first member and being rotatable to thereby cause said mirror to move about said first axis as said first cam rotates;

a second eccentric cam having a cam surface abutting said mirror of said second member and being rotatable to thereby cause said mirror to move about said second axis as said second cam rotates; and means for holding said first and second surfaces in constant abutmemt relation to said first member and said mirror holder respectively to thereby hold said mirror in a fixed position about said first and second axes.

5. An apparatus in accordance with claim 4 wherein each of said cams has a connecting shaft extending in a forward direction to thereby provide simultaneous viewing of the displayed image brightness as said cams are rotated.

6. In a microform reader apparatus of the type which projects a magnified image of a film frame image onto a viewing screen and which includes a light source, a condensing lens, a film holder and a projection system including a plurality of mirrors for projecting the magnified image onto the viewing screen, the improvement of an adjustable lens assembly which allows the optical axis of the lens assembly to be adjusted for perpendicularly to the image frame surface comprising:

a generally cylindrical lens holder assembly having a major center axis for holding at least one projection lens having a center optical axis in a predisposed relation such that said major axis and said optical axis substantially coincide, said lens holder assembly comprising a lens holder cylinder for holding said lens, an outer lens cylinder dimensioned for receiving and holding said lens holder cylinder, and a cylindrical sleeve dimensioned for receiving said outer lens cylinder in radially spaced relation for allowing focusing movement of said outer lens cylinder;

a generally cylindrical first adjustment ring dimensioned for receiving said lens holder assembly and having a continuous circumferential flange having an upper surface and a ramped under surface;

said cylindrical sleeve comprising a circumferential flange communicating with said upper surface of said first ring flange for holding said lens holder assembly in fixed relation to said first ring; and a second adjustment ring dimensioned for receiving said first adjustment ring and having an inner circumferential ramped surface portion communicating with said ramped under surface.

7. An apparatus in accordance with claim 6 further comprising a focusing shaft having a pin at one end and wherein said circumferential flange includes an opening for receiving said focusing shaft and allowing said pin to communicate with said outer lens cylinder to thereby impart forcusing vertical movement to said outer lens cylinder as said shaft turns and wherein said shaft is pivotable at its other end.

8. An apparatus in accordance with claim 6 wherein said inner circumferential ramped surface portion of said second adjustment ring is recessed for receiving said flange of said first ring to thereby preclude relative horizontal movement of said first ring relative to said second ring.

9. An apparatus in accordance with claim 8 further comprising means for securing said first ring flange to said recessed ramped surface for holding said first and second rings in a fixed relative position.

* * * * *